Jan. 12, 1971 H. E. TEAGUE 3,555,501
DETERMINING SUBSURFACE VELOCITY AND DISTINGUISHING BETWEEN
PRIMARIES AND MULTIPLES BY VELOCITY FILTERING
Filed Feb. 10, 1969 4 Sheets-Sheet 4
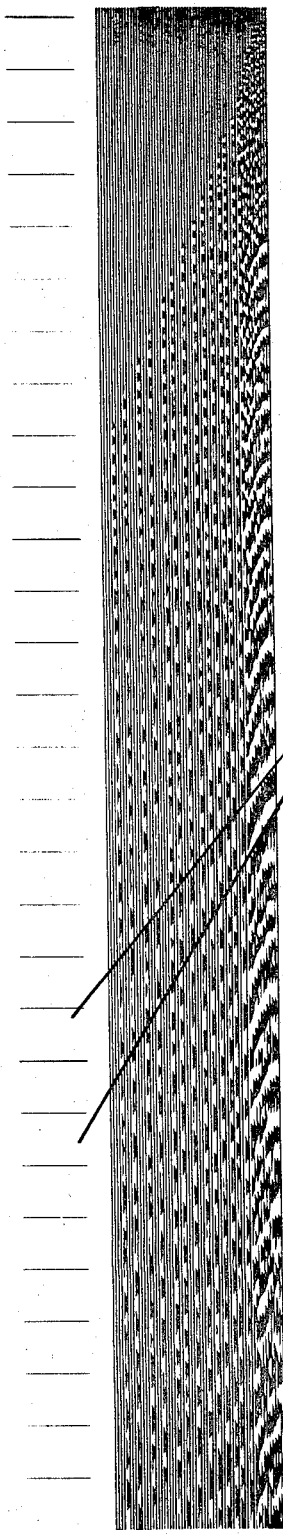
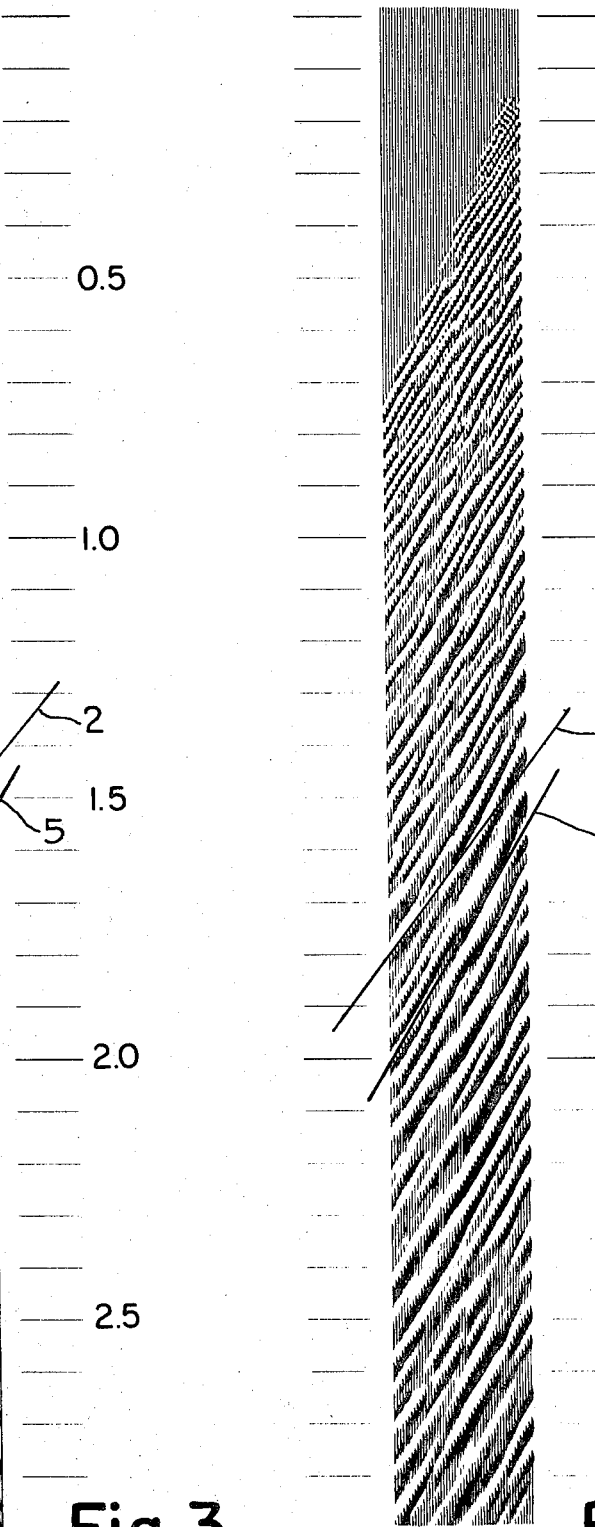
Fig. 3
Fig. 4

United States Patent Office

3,555,501
Patented Jan. 12, 1971

3,555,501
DETERMINING SUBSURFACE VELOCITY AND DISTINGUISHING BETWEEN PRIMARIES AND MULTIPLES BY VELOCITY FILTERING
Henry E. Teague, Dallas, Tex., assignor to Mobil Oil Corporation, a corporation of New York
Filed Feb. 10, 1969, Ser. No. 797,790
Int. Cl. G01v 1/28
U.S. Cl. 340—15.5           2 Claims

ABSTRACT OF THE DISCLOSURE

In seismic exploration, seismograms representing reflection times $t$ as a function of distance $x$ along a line of exploration are converted to the $X^2$–$T^2$ form. Reflections appearing as a hyperbolic function of distance on the original seismogram are converted to a linear plot from which acoustic velocity can be directly determined. The seismograms in the $X^2$–$T^2$ form are particularly suitable for velocity filtering.

BACKGROUND OF THE INVENTION

This invention relates to seismic exploration and more particularly to a method of transforming seismograms to a form from which acoustic velocity of the earth can be directly determined.

In seismic exploration the measurement of velocity is generally recognized as the major parameter in the processing and interpretation of seismograms. The determination of the acoustic velocity characteristic from seismograms is described in "Seismic Velocities From Subsurface Measurements," C. H. Dix, Geophysics, vol. 20, pp. 68–86, 1955.

Briefly, acoustic velocity is usually determined from seismograms by use of the relationship $$T_R = \sqrt{T_0^2 + H^2/V^2}$$

In the foregoing, $T_R$ is the travel time of a seismic wave traveling from a source to an interface and back to a surface receiver. This is the time of the reflection on the seismogram. $T_0$ is the ideal vertical travel time from the surface of the earth to the reflection point. H is the horizontal distance from the source to the receiver and V is the acoustic velocity. Velocity can be determined by curve fitting techniques.

In seismic exploration, it is common to obtain a plurality of seismograms, or seismic traces, along a line of exploration. These seismograms, taken as a set, represent the reflection times of seismic energy as ordinants versus the distance along a line of exploration as abscissa. The foregoing equation suggests that the times of reflections from a particular reflector will be a hyperbolic function across the seismogram. The acoustic velocity of the earth between the surface and this reflector can be found by making an $X^2$–$T^2$ plot of the reflecting times. The acoustic velocity is determined from the slope of this $X^2$–$T^2$ plot.

Many field exploration techniques can be used to obtain the seismogram for use in velocity determinations. One commonly used field technique is referred to as the common depth point technique for obtaining multiple coverage of subsurface reflecting points. Another exploration technique is referred to as "end on" shooting, that is, with the source on the same side of the detector spread for each generation of seismic energy.

One example of deriving velocity information from common depth point traces is described in "Dynamic Correlation Analysis" by William A. Schneider and Milo M. Backus, a paper presented at the 36th Annual International SEG Meeting, Houston, Tex., Nov. 9, 1966.

Before useful information can be obtained from the field seismograms, it is common to process the seismograms in a digital computer to suppress noise and multiple reflections. One technique which is particularly useful in suppressing multiple reflections is referred to as velocity filtering. Velocity filtering techniques are described in U.S. Pats. 3,274,541, Embree, and 3,284,763, Burg et al., and in "Optimum Multichannel Velocity Filters," R. L. Sengbush and M. R. Foster, Geophysics, vol. 33, No. 1, February 1968, p. 11.

SUMMARY OF THE INVENTION

In accordance with an important aspect of the present invention, seismic traces in the normal $x$–$t$ form are converted to $X^2$–$T^2$ form. In the $X^2$–$T^2$ form, reflections which are normally hyperbolic functions appear as a linear function across the set of seismograms. The slope of the reflections can be directly obtained and converted to a value of acoustic velocity between the surface and the reflector.

In accordance with another aspect of the present invention, the seismograms are converted to the $X^2$–$T^2$ form before they are velocity filtered. Because the reflections occur as linear functions in the $X^2$–$T^2$ form of the seismograms, the velocity filtering can be effectively set to reject multiples in the seismograms.

After the $T^2$–$X^2$ seismograms have been velocity filtered, the average velocity of the reflection events is determined by obtaining the slope of these reflection events. This slope determination may be done in a number of ways. One particularly suitable way to do this is to use a summing technique. This technique includes selecting the amplitude of adjacent traces along search lines which have differing moveouts from trace-to-trace; that is, the search lines occur at various attitudes to determine the presence of dipping reflections. The amplitudes of selected portions of adjacent traces are summed along each search line. The sum having the maximum value indicates the search line having an attitude indicating the dip of the subsurface formation producing that particular primary reflection.

In accordance with other aspects of the present invention, there is provided a unique technique for converting the seismograms from the $x$–$t$ form to the $X^2$–$T^2$ form.

Accordingly, it is an important object of the present invention to convert seismograms in the $x$–$t$ form to the $X^2$–$T^2$ form from which acoustic velocity can be directly determined from the seismograms.

It is another object of the present invention to convert seismograms to the $X^2$–$T^2$ form in which multiple reflections can be immediately differentiated from primary reflections.

It is another object of the present invention to convert seismograms to the $X^2$–$T^2$ form which is uniquely suitable for velocity filtering.

It is still another object of the present invention to provide an efficient technique for converting seismograms from $x$–$t$ to the $X^2$–$T^2$ form.

The foregoing and other objects, features and advantages of the invention will be better understood from the following more detailed description taken in conjunction with the drawings.

DESCRIPTION OF THE DRAWINGS

FIG. 3 shows a set of seismic traces which have been converted to the $X^2$-$T^2$ form; and FIG. 4 shows a set of seismograms in the $X^2$-$T^2$ form which have been velocity filtered.

DESCRIPTION OF A PARTICULAR EMBODIMENT

Figure 1A:
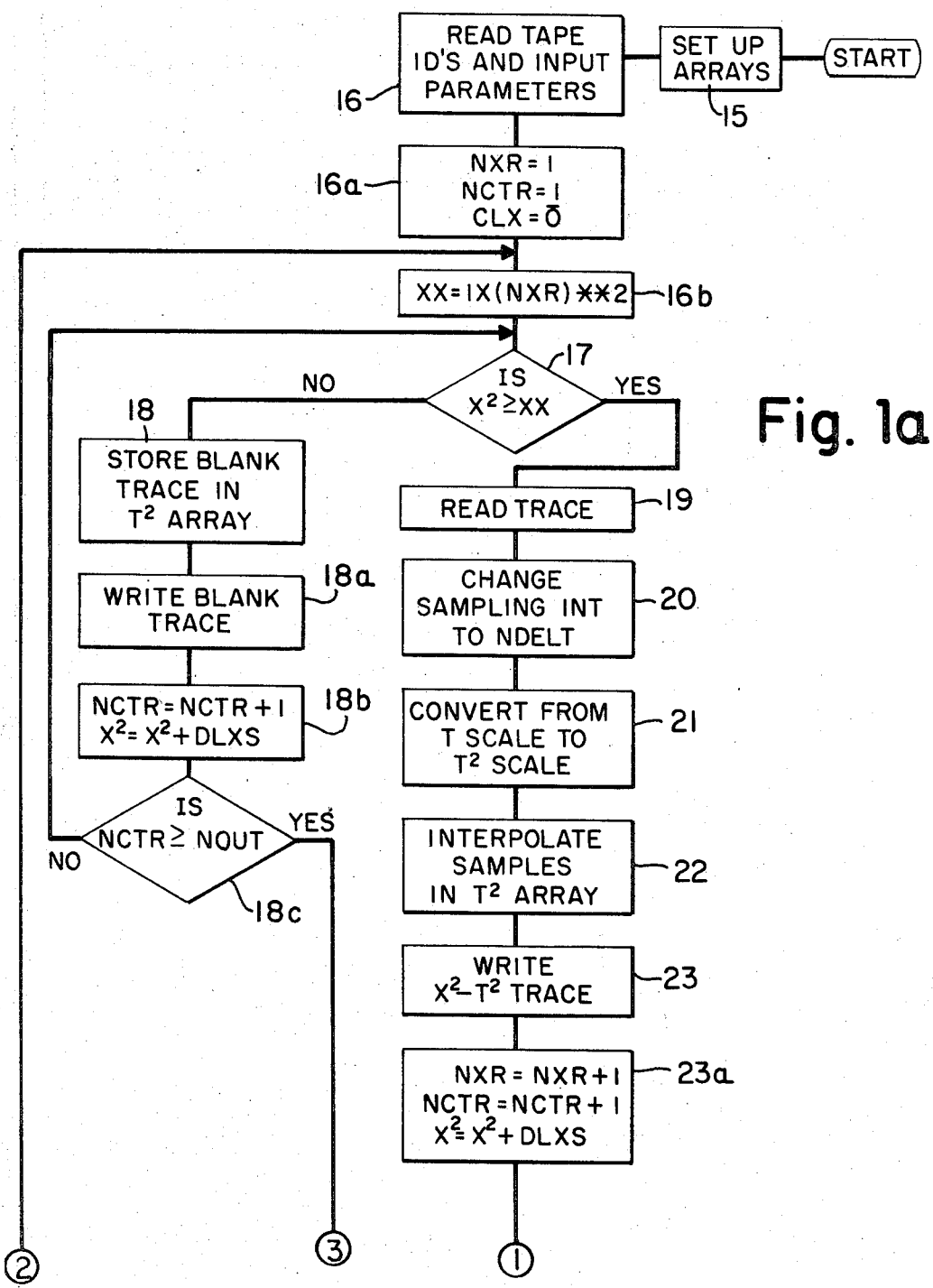
FIG. 1a shows a portion of a block diagram of the technique of this invention.

Before proceeding with a detailed description of the steps of the present invention, as depicted on the flow chart of FIG. 1, reference will be made to FIGS. 2, 3 and 4 which show seismograms. FIG. 2 is a conventional set of seismograms commonly referred to as a variable area cross section. Shown in FIG. 2 are four sets of seismograms, each made up of 24 traces. For ease of reference, indicia marks at the top of the section show the division of the section into four groups of 24 traces each. For the purposes of this discussion, we will be concerned with the set of 24 traces which is the second set from the left.

As is common in seismic exploration, each of the traces represents the seismic energy received at a seismometer, the seismometers being spaced along a line of exploration. Therefore, the abscissa in FIG. 2 represents distance, $x$, along the line of exploration. The ordinant in FIG. 2 is time given in seconds. Where there is a wide, dark area on a trace, this indicates that the seismometer received a reflection of seismic energy at that time. For example, refer to the time 1.21 seconds. At that time, the center trace shows a reflection. the other traces under consideration show reflections, from the same reflector, at subsequent times. A heavy line has been drawn through these reflections and is marked with the reference numeral 1. As expected, the time of reflection is a hyperbolic function of the distance across the seismic section.

In accordance with the present invention, seismic sections, in $x$–$t$ form of the type shown in FIG. 2 are converted to the $X^2$-$T^2$ form as shown in FIG. 3. The increments of the distance $x$ along the abscissa of FIG. 2 have been converted to increments of the distance $X^2$. The sampling times $t$ along the ordinant of FIG. 2 have been converted to sampling time $T^2$ in FIG. 3. For example, the time 1.21 seconds in FIG. 2 corresponds to the time 1.46 seconds squared in FIG. 3. The reflection on the center trace at that time corresponds with the reflection on the center trace at 1.21 seconds in FIG. 2. A line, denoted by the reference numeral 2, has been drawn through the reflections corresponding with the reflections indicated by the line 1 in FIG. 2.

The acoustic velocity of the earth can be directly determined from the slope of the line 2. The determination of acoustic velocity from the slope of an $X^2$-$T^2$ plot is described "Sesimic Velocities From Subsurface Measurements," C. H. Dix, Geophysics, vol. XX, No. 1, January 1955, pp. 68–86. One of the principal advantages of the present invention is that the acoustic velocity can be directly determined from the processed seismograms themselves without the necessity of intermediate calculations.

FIG. 4 is a velocity filtered version of FIG. 3. The seismograms in the $X^2$-$T^2$ form are particularly suitable for velocity filtering to remove multiple reflections for the following reasons.

Generally speaking, a lower velocity event at approximately the same record time as that of a higher velocity event is considered to be a multiple. For example, the event indicated by the line 3 in FIG. 4 is the same primary reflection as indicated by the lines 1 and 2 in FIGS. 2 and 3. However, the event indicated by the lines 4, 5 and 6 is a multiple reflection.

Generally speaking, velocity increases with depth and with record time on the seismogram. Multiples are generated by energy reflecting back and forth in shallow zones before being recorded. Therefore, when a multiple reflection is recorded at about the same time as a true reflection event, the multiple has been traveling in lower velocity formations and has a greater slope than the true reflections. As can be seen from FIG. 4, the present invention provides a great advantage over prior art techniques in differentiating between multiple reflections and primary reflections. A reflection having a greater slope, i.e., lower velocity, than another reflection occurring at approximately the same time is immediately recognized as a multiple reflection.

Figure 1B:
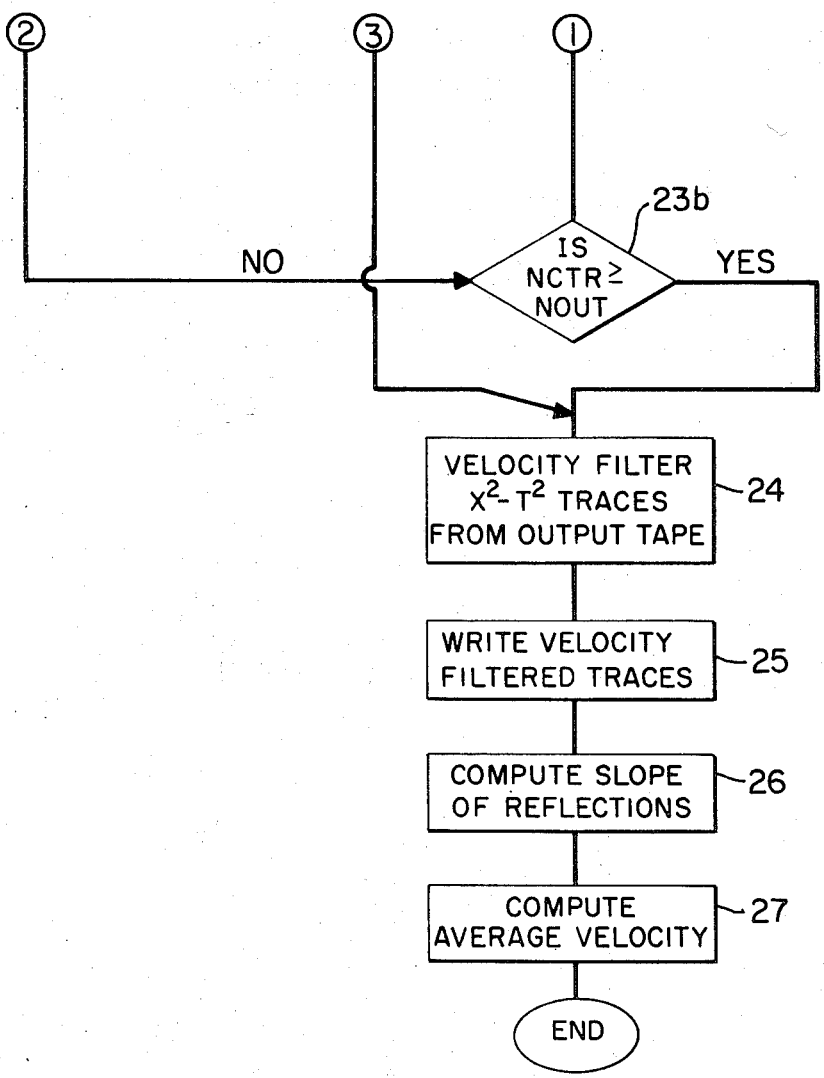
FIG. 1b shows another portion of the block diagram.
Figure 1C:
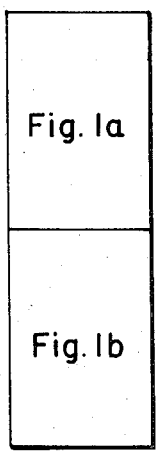
FIG. 1c shows the manner in which FIGS. 1a and 1b fit together to form the block diagram.
Figure 2:
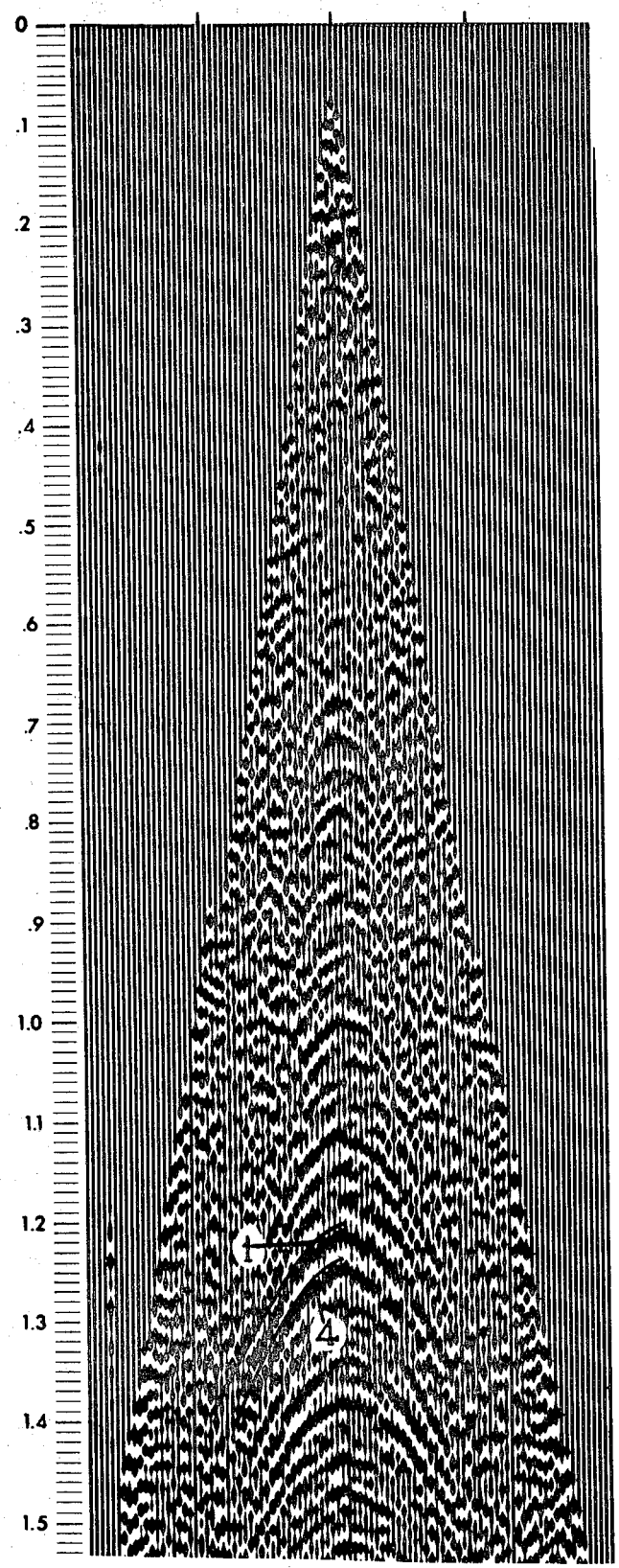
FIG. 2 shows a set of seismic traces in the $x$–$t$ form.

The invention can be better understood from FIGS. 1a and 1b which form a flow sheet, or block diagram, of the digital computer process. In accordance with normal programming techniques, areas in storage are reserved, as indicated at 15, by setting up the proper arrays. The input tapes, ID's, are read, as indicated at 16. These input tapes contain sets of digital samples which represent the reflection of seismic energy at various sample times. Each of these traces is from a seismometer spaced along a line of exploration. Each of the seismic traces represents the reflection of seismic energy at an increment of the distance $x$ along the line of exploration. In accordance with well-known seismic exploration techniques, the tapes may be digitally recorded in the field, or analog electric signals may be converted to digital form.

Initially, the quantities NXR, NCTR and CLX are set to the values indicated at 16a.

In order to convert the distance $x$ along the line of exploration to increments of the distance $X^2$, the steps indicated at 17, 18 and 19 are performed. These steps can be better understood with reference to a specific example. Consider the case discussed with reference to FIG. 2 wherein 24 inputs traces are processed. Assume that the seismometers were spaced at 100 foot intervals along the line of exploration. That is, $x_1=100'$; $x_2=200'$; $x_3=300'$ . . . $x_{24}=2400'$. Assume that the traces are to be processed so that there are 60 output traces, as in FIG. 3. Therefore, the increments of the distance $X^2$ will be $$X_a^2 = \frac{(2400)^2}{60}$$

$$=96000; X_b^2=2(96000); X_c^2=3(96000) \ldots$$

$$X_m^2=60(96000)$$

As indicated at 17 in the flow sheet, a determination is made as to whether $X^2$ is greater than $xx$. Referring to the example, the first increment of $X^2$ is:

$$X^2=0$$

The first increment of $xx$ is:

$$x_1x_1=(100)(100)$$

$X^2$ is not greater than $x_1x_1$. Therefore, a blank trace is stored. The storage of the blank trace is indicated at 18 and the writing of the blank trace is indicated at 18a in the flow sheet. The values of NCTR and $X^2$ are incremented as indicated at 18b. The dummy variable NCTR, which is the trace counter, is compared to NOUT, the number of output traces, as indicated at 18c. If NCTR is greater than NOUT, the program exits from the loop. If not, a determination is made as to whether the incremented value of $X^2$ is greater than $xx$ as indicated at 17. The next increment of $X^2$ is 96000. This is greater than $x_1x_1$ which is (100)(100). Therefore, a data trace is stored in the $X^2$ array, interpolated and written out, as indicated at 19, 20, 21, 22 and 23 in the flow sheet. Then, the value of $X^2$ is incremented as indicated at 23a and the determination is made again. The next increment of $X^2$ is $X_b^2=2(96000)$ which is greater than $x_2x_2$. Again, a data trace is stored in the $X^2$ array, interpolated and written out. The value of $X^2$ is incremented again and the determination is repeated. The first blank trace is written when $X^2=0$; $x_1x_1=10000$. The next blank trace is written when $X^2=960000$; $x_{10}x_{10}=1000000$. The processing continues with blank traces being interposed with the field traces.

The result of this type of processing can be seen with reference to FIG. 3 which shows blank traces interposed between live traces. It will be noted that this does not detract from the over-all representation of the reflections on the seismogram. Note, also, the traces in FIGS. 2, 3 and 4 were written out from right to left.

The steps indicated at 20, 21 and 22 convert the sampling times $t$ on the input traces to sampling times $T^2$. As indicated at 20, the sampling interval is changed to NDELT which is the sampling interval for the output traces. As indicated at 21, a conversion is made from the $t$ scale to the $T^2$ scale. For each trace, this involves writing the digital values from the input trace array, referred to as the $X^2$ array in the flow sheet and as the S array in the program listing which follows, to the output trace array (referred to as the $T^2$ array in the flow sheet and as the A array in the program listing which follows).

Zeroes are interposed at sample times in the output array where no digital value exists. For example, the input array might be represented as follows.

| Sample time: | S array |
|---|---|
| $t_1$ | $S(t_1)$ |
| $t_2$ | $S(t_2)$ |
| $t_3$ | $S(t_3)$ |
| $t_4$ | $S(t_4)$ | where for a particular trace $S(t_1)$ is the digital value of the reflection at sample time $t_1$, $S(t_2)$ is the digital value at the sample time $t_2$, and so on.

The output array, after conversion to the new sampling interval, will be as follows.

| Sample time: | A array |
|---|---|
| $T_1$ | 0 |
| $T_2$ | $S(t_1)$ |
| $T_3$ | $S(t_2)$ |
| $T_4$ | 0 |
| $T_5$ | 0 |
| $T_6$ | $(St_3)$ |
| $T_7$ | 0 |
| $T_8$ | 0 |
| $T_9$ | 0 |
| $T_{10}$ | $S(t_4)$ |

Note that zeroes have been interposed at sample times where there is no digital value. This is quite similar to the operation previously performed to convert from the $x$ array to the $X^2$ array as indicated at 17, 18 and 19 in the flow sheet.

However, the zeroes do not remain in the output array. As indicated at 22, the samples are interpolated to replace the zeroes. That is, the value $S(t_1)$ is interpolated back to the sample time $T_1$ to obtain a value for that sample time. The values of $S(t_2)$ and $S(t_3)$ are interpolated to obtain values for the sample times $T_4$ and $T_5$, and so on.

The conversion of the traces from $x$–$t$ form to the $X^2$–$T^2$ form is complete. The traces in the $X^2$–$T^2$ form are written out as indicated at 23 to produce a plot of the type shown in FIG. 3. These traces are reproduced automatically from the digital output of the digital computer. One type of equipment which is particularly suitable for producing an output of the type shown in FIG. 3 is a cross-section plotter for digital computers manufactured by Geospace Corporation, Houston, Tex., and identified as SP–201.

The values of NXR, NCTR and $X^2$ are incremented as indicated at 23a.

The traces in the output array are now ready for velocity filtering. The velocity filtering operation is denoted at 24 in FIG. 1. Velocity filtering is performed in the digital computer and may be accomplished by any one of several standard techniques. The techniques referred to in the velocity filtering patents and references previously mentioned are suitable for use here.

The velocity filtered traces, of the type shown in FIG. 4, are written out as indicated at 25.

The process can be continued to automatically pick and compute the slope of the reflections as indicated at 26. Digital computer programs are commercially available for picking the reflections across a set of seismograms and computing the slope of the resulting plot. After this has been done, the average velocity can be automatically computed as indicated at 27.

The process of this invention can be implemented with different digital computer programs and the operations can be carried out on various types of digital computing equipment. One particular program for converting the seismic traces from the $x$–$t$ form to $X^2$–$T^2$ form is given below by way of example.

One particular computing system which is suitable for use is supplied by the Control Data Corporation under the general model designation 6600, and includes the following components:

6604 Central Computer, 65K memory
6608 Disc System
6602 Console Display
6681 Data Channel Converter
3228 Magnetic Tape Controller
607 Magnetic Tape Transport
3447 Card Reader Controller
405 Card Reader
3256 Line Printer Controller, and
501 Line Printer.

The particular FORTRAN program for carrying out the invention, including certain modifications, is given below, followed by a brief description of the operation of the program. This program is specified in FORTRAN language suitable for use on most digital computers. For a better understanding of the use of FORTRAN statements, reference should be made to "Introduction to FORTRAN," S. C. Plumb, McGraw-Hill Book Company, New York, N.Y.

The input parameters are as follows:

DLXS—this is the sampling interval in the $X^2$ plane.

In the example previously considered, the sample interval in the $X^2$ plane is 96000, that is, there are output traces at $X_a^2=96000$, at $X_b^2=2(96000)$, at $X_c^2=3(96000)$, and so on. CLX is incremented by DLXS each time a determination is made as to whether $X^2$ is greater than or equal to $xx$, as indicated at step 17 in the flow sheet.

NUI—input from a tape unit
NUO—output to tape unit
NREC—record number to be processed
NTRCS—number of traces
NOUT—number of output traces (in this case, 60)
NSOUT—number of output samples
NDELT—sample interval
NRI—input reel number
DUM—end of file The program is as follows:

```
    LSRDP(DLXS, NUI, NUO)
    DIMENSION X(34)
    /12/A(12096)
 10 COMMON/DATA/IDR(18), AL(94), KTR(14),
    S(4000), IA(3) XMAX=2400.0
 65 READ (NUO)NRO
 70 READ (NUO)DUM
 15 READ 20, NREC, NTRCS, NOUT, NSOUT, NDELT
    IF(NREC)25, 350, 25
 20 FORMAT (5I10)
 25 READ 30, (X (J)), J=1, NTRCS)
 30 FORMAT (8F10.0)
 55 READ (NUI)NRI
 60 READ (NUI)DUM
 75 CALL IDIN(NUI)
 80 IF(IA(2))85, 999, 85
 85 IF(IDR(3)−NREC)105, 90, 90
```

```
 90 CONTINUE
 95 NS4=IDR(5)
100 GO TO 120
105 NS4=IDR(5)
110 CALL TRIN(NUI, NS4)
115 IF(IA(2))110, 75, 110
120 IDR(2)=NRO
130 IDR(4)=NOUT
135 IDR(5)=NSOUT
140 IDR(6)=NDELT
145 CALL IDOUT(NUO)
150 NXR=1
155 NCTR=1
160 DLXS=XMAX**2/FLOATF(NOUT—1)
    PRINT 807, DLXS
807 FORMAT(7H DLXS=E16.8)
165 CLX=0.0
185 XX=X(NXR)**2
190 IF(CLX—XX)195, 250, 250
195 DO 200 J=1, NSOUT
200 S(J)=0.0
205 KTR(1)=NCTR
210 CALL TROUT(NUO, NSOUT)
215 PRINT 220, NCTR, CLX, XX
220 FORMAT (10 H ZERO TRCI3, 6H CLX=F10.0, 5H
    XX=F10.0)
230 NCTR=NCTR+1
235 IF(NCTR—NOUT)240, 240, 999
240 CLX=CLX+DLXS
245 GO TO 190
250 CALL TRIN(NUI, NS4)
    IF (IA(2))255, 170, 255
255 KG=NDELT/IDR(6)
260 IF(KG—1)271, 271, 265
265 DO 270 J=1, NS4, KG
270 S(J/KG+1)=S(J)
271 NSW=NS4/KG
272 DELT=FLOATF(NDELT)/1000.0
275 DO 280 J=1,NSOUT
280 A(J)=0.0
285 DO 315 J=1,NSW
290 TM=FLOATF(J—1)*DELT
295 TMS=TM*TM
300 IND=TMS/DELT+1.2
305 IF(IND—NSOUT)310,310,1280
310 A(IND)=S(J)
315 CONTINUE
1280 A(NSOUT)=0.0
1285 N1=2
1290 N2=2
1300 IF(A(N1))1305,1310,1305
1305 N1=N1+1
1306 GO TO 1300
1310 IF(N1—NSOUT)1315,1380,1380
1315 N2=N1
1320 IF(A(N2))1335,1325,1335
1325 N2=N2+1
1330 GO TO 1320
1335 IF(NSOUT—N2—50)1380,1380,1340
1340 AF=FLOATF(N2—N1+1)
1345 DELA=(A(N2)—A(N1—1))/AF
1350 TEMP=A(N1—1)+DELA
1355 DO 1365 J=N1,N2
1360 A(J)=TEMP
1365 TEMP=TEMP+DELA
1370 N1=N2
1375 GO TO 1300
1380 DO 1385 J=1,NSOUT
1385 S(J)=A(J)
1387 KTR(1)=NCTR
1390 CALL TROUT(NUO,NSOUT)
     CLX=CLX+DLXS
320 PRINT 325,KTR(1),NXR,CLX,XX
325 FORMAT (17H TRC TRCO,CLX,
    XX/(2I10,2F10.0))
330 NXR=NXR+1
340 NCTR=NCTR+1
345 IF(NCTR—NOUT)185,185,999
999 END FILE NUO
    REWIND NUI
    GO TO 15
350 END FILE NUO
355 REWIND NUO
360 CALL CKTP(NUO,4)
    RETURN
    END
```

In the foregoing, the numbers preceding certain instructions are given for identification only. The first DIMENSION instruction is a standard FORTRAN statement which reserves storage for the values of X, the trace distances, and reserves storage in the A array for the traces. The instruction COMMON/DATA is also a standard FORTRAN statement which puts the traces into a format which can be read by read-in and read-out subroutines TRIN and TROUT. The instructions 105–115 skip over traces on the input tape that are not to be processed. Instruction 250 reads a trace in that which is to be processed. Normally, the form of these instructions will vary from system to system in accordance with the format of the input traces. In the particular system under consideration, NRO is the reel number of the output tape. This number is read from input unit NUO. Instruction 25 reads the trace distances in the $x$ plane, from 1 to NTRCS. Instruction 75 reads-in the record parameters, i.e., the number of traces, the reel number, etc. Instruction 80 senses the end of the file, that is, when all the information on the tape has been processed. Instruction 110 reads-in a trace from the input unit NUI. Instruction 150 is the input trace counter and instruction 155 is the output trace counter.

At instruction 165, the value CLX is initially set equal to zero. Instructions 185–245 perform the steps indicated at 17, 18, 17a, 18b and 18c of the flow sheet. CLX is continuously incremented so that it is equal to the value of $X^2$. If CLX is greater than or equal to $X^2$, instruction 190 specifies a jump to 250 which calls in the input trace so that it is stored in the $X^2$ array. If CLX is less than $xx$, all zeroes are written in the array. This inserts a blank trace at increments where there is no input trace.

Instructions 255 through 270 change the sampling interval to NDELT as indicated by the step 20 in the flow sheet. The instructions 285 through 315 convert from the $t$ scale to $T^2$ scale as indicated by the step 21 in the flow sheet. That is, a new array is formed with zeroes inserted at the sampling times where no digital value exists.

Instructions 1285 through 1375 interpolate the samples in the $T^2$ array (referred to in the program as the (A) array) so that there is a value at all sampling times.

The remaining instructions are instructions which terminate the processing of a particular set of data. There is now contained in the A array a set of digital values which have been converted to $X^2$–$T^2$ form. These are suitable for read-out and printing of a record of the type shown in FIG. 3.

While a particular embodiment of the invention has been described, it will be understood that various modifications may be made. The appended claims are, therefore, intended to cover such modifications within the true spirit and scope of the invention.

What is claimed is:

1. In seismic exploration wherein seismic traces represent the reflection of seismic energy, the method of processing said traces in a stored program digital computer comprising:

generating digitized samples of the seismic traces representing the reflection of seismic energy at sampling times $t$ as a function of increments of distance $x$ along a line of exploration, which increments are denoted by the incremental values $x_1, x_2, x_3 \ldots x_n$, converting said increments of the distance $x$ to increments of the distance $X^2$ which are denoted by incremental values $X_a^2, X_b^2 \ldots X_m^2$ by the steps of:
generating $x_1x_1$ and $X_a^2$,
comparing $x_1x_1$ to $X_a^2$,
if $X_a^2$ is greater than or equal to $x_1x_1$,
storing the trace representing seismic energy at $x_1$ in an $X^2$ array, and incrementing $X_a^2$ and $x_1x_1$ to $X_b^2$ and $x_2x_2$,
if $X_a^2$ is less than $x_1x_1$, storing a blank trace in the $X^2$ array and incrementing $X_{a2}$ to $X_b^2$, and
repeating the foregoing steps by incrementing $X^2$ and $x$ to successive values of the respective series until the value of $X^2$ has been incremented to $X_m^2$ and the value of $x$ has been incremented to $X_n$,
converting said sampling times $t$ to sampling times $T^2$,
storing said digitized samples corresponding with sampling times $T^2$ and increments of distance $X^2$ in an $X^2$-$T^2$ array so that the sampling times of reflections are linear as a function of distance in said $X^2$-$T^2$ array, and
velocity filtering the digitized samples in said $X^2$-$T^2$ array with a velocity filter which accentuates reflections which are linear as a function of distance.

2. The method recited in claim 1 wherein the step of converting said sampling times $t$ to sampling times $T^2$ includes:
storing in the $X^2$-$T^2$ array digitized samples of said seismic traces,
writing zeroes in the $X^2$-$T^2$ array at sampling times for which there is no digitized sample of the seismic trace, and
interpolating said digitized samples to fill said $X^2$-$T^2$ array with interpolated samples at the times previously filled with zeroes.

References Cited
UNITED STATES PATENTS

| | | | |
|---|---|---|---|
| 3,084,332 | 4/1963 | Amery | 340—15.5 |
| 3,181,644 | 5/1965 | Roever | 340—15.5 |

RODNEY D. BENNETT, JR, Primary Examiner

D. C. KAUFMAN, Assistant Examiner

PO-1050
(5/69)

UNITED STATES PATENT OFFICE
CERTIFICATE OF CORRECTION

Patent No. 3,555,501                    Dated   January 12, 1971

Inventor(s)  Henry E. Teague

It is certified that error appears in the above-identified patent and that said Letters Patent are hereby corrected as shown below:

Entire patent assembled in reverse order.

Column 3, line 29, "the" should be --The--;
          line 52, before "seismic" insert --in--.
Column 5, line 38, "(St$_3$)" should be --S(t$_3$)--.
Column 6, line 69, should be --25 READ 30,(X(J),J=1,NTRCS)--.
Column 8, line 38, "17a" should be --18a--.
Column 9, line 11, "X$_{a2}$" should be --X$_a^2$-- (Original Claim 8 (Amended) line 22, per Amendment "B" filed April 17, 1970.)

Signed and sealed this 20th day of April 1971.

(SEAL)
Attest:

EDWARD M. FLETCHER, JR.                   WILLIAM E. SCHUYLER, JR.
Attesting Officer                           Commissioner of Patents